United States Patent Office 2,848,487
Patented Aug. 19, 1958

2,848,487

RECOVERY OF CADMIUM FROM A RESIDUE OBTAINED IN THE MANUFACTURE OF TEREPHTHALIC ACID

Robert T. Keen, Wilmington, Del., assignor to Hercules Powder Company, Wilmington, Del., a corporation of Delaware No Drawing. Application July 16, 1956
Serial No. 597,881

4 Claims. (Cl. 260—515)

The present invention relates to a process for the recovery of cadmium from a reaction residue. More particularly, it relates to the recovery of cadmium from a residue obtained in the manufacture of aromatic dicarboxylic acids by the rearrangement, in the presence of a cadmium catalyst, of monovalent metal salts of aromatic carboxylic acids which differ from the aromatic dicarboxylic acid to be produced. Still more particularly, it relates to the recovery of cadmium from a residue obtained in the manufacture of terephthalic acid by heating a monovalent salt of a benzene carboxylic acid other than terephthalic acid in the presence of a cadmium catalyst, whereby said salt is transformed into the corresponding monovalent salt of terephthalic acid.

There has recently been devised a process for the manufacture of terephthalic acid which is a practical utilization of the discovery that a monovalent salt of benzoic acid, orthophthalic acid, or isophthalic acid can be transformed by heating at a relatively elevated temperature into the corresponding monovalent salt of terephthalic acid. This method and its various modifications are described, among other places, in Australian Patent No. 163,524; Belgium Patents 522,289; 524,035; 533,755; U. S. patent applications, Serial Nos. 392,512; 395,609; 449,266; and 472,245, all now abandoned, to Bernhard Raecke and in U. S. patent applications, Serial Nos. 472,246, now U. S. Patent No. 2,794,830, and 480,620 by Bernhard Raecke et al., the disclosures of which are incorporated in this application by reference.

Still more recently, the above process has been extended to the manufacture of terephathalic acid from benzene carboxylic acids having three or more carboxyl groups. In U. S. patent application Serial No. 582,087 by Schenk et al., filed May 2, 1956, for example, there is described the manufacture of terephthalic acid by a process which comprises heating a monovalent metal salt of such acids as hemi-mellitic acid, trimellitic acid, trimesitinic acid, mellophanic acid, prehnitic acid, pyromellitic acid, benzene-pentacarboxylic acid, and mellitic acid, as well as mixtures of such salts with themselves or with salts of benzoic acid in the presence of a catalyst. The same application also describes the manufacture of polycyclic aromatic dicarboxylic acids from monovalent metal salts of aromatic carboxylic acids having polycyclic, especially bicyclic, aromatic ring systems such as $\alpha$- and $\beta$-naphthoic acids, naphthalic acid, diphenic acid, diphenyl-2,3,4'-tricarboxylic acid, naphthalene - 1,4,5 - tricarboxylic acid, diphenyl - 2,3,5,6 - tetracarboxylic acid, naphthalene - 1,- 4,5,8 - tetracarboxylic acid, and the like. For example, monovalent metal salts of $\beta$-naphthoic acid can be transformed to monovalent metal salts of 2,6 - naphthalene dicarboxylic acid.

Summarizing briefly the prior art as above described, there is proposed a process for the manufacture of dicarboxylic acids in which the starting material is a monovalent metal salt of an aromatic carboxylic acid different from the acid to be produced. The preferred metal salts are those of lithium, potassium, sodium, rubidium, and cesium, with the most preferred salt being that of potassium. According to the process, the monovalent metal salt of the starting aromatic carboxylic acid is transformed in good yield to the corresponding monovalent salt of the desired aromatic dicarboxylic acid by heating to a high temperature in an atmosphere substantially free from oxygen. Benzene is also obtained as a byproduct when the starting material is a salt of benzoic acid. The reaction temperature can vary from about 300° C. up to the decomposition temperature of the starting material or the desired reaction product but preferably is within the range of 340° C. to 500° C. The reaction can be carried out at any convenient pressure although a superatmospheric pressure is preferred. Also preferred is an atmosphere of an inert gas such as carbon dioxide, hydrogen, argon, or the like.

A most preferred embodiment of the prior art process resides in the employment of cadmium, preferably in the form of a cadmium compound, as a catalyst for the reaction. As catalysts of this description, there can be mentioned metallic cadmium, cadmium oxide, cadmium iodide, cadmium chloride, cadmium fluoride, cadmium sulfate, cadmium phosphate, cadmium carbonate, cadmium acetate, cadmium benzoate, cadmium phthalate, cadmium isophthalate, cadmium terephthalate, and cadmium stearate. The employment of such catalysts in the reactions promotes a more rapid reaction and enables higher yields of the desired product. Any finite amount of cadmium is beneficial and amounts up to about 15% by weight of the entire reaction mixture can be used.

The present invention is particularly concerned with the recovery of cadmium from a reaction residue which is obtained in the above preferred embodiment of the prior art process.

Regardless o f what starting material is employed and regardless of the reaction conditions, the above preferred embodiment of the prior art process produces a crude reaction product which contains an appreciable quantity of the monovalent metal salt of desired aromatic dicarboxylic acid and lesser amounts of unchanged starting material, organic impurities of unknown composition, and cadmium; benzene, when it is a product of the reaction, is ordinarily separated by volatilization during the reaction. It has previously been found that acid can be recovered from the reaction product by extraction with water. This dissolves the salt of the desired acid and the unchanged starting material, and from this solution the desired acid can be precipitated in relatively pure form by the addition of a mineral acid.

The extraction of the reaction product with water has been found to leave a water-insoluble residue which is composed essentially of the aforesaid organic impurities and cadmium. It has been determined by analysis that virtually all of the cadmium initially present in the reaction is contained in this residue and that regardless of the form in which the cadmium was initially present, it exists in the residue chiefly in the form of cadmium carbonate with a minor amount as metallic cadmium.

It is, of course, important to the economics of the overall process that the cadmium be reused in the process. It has been found that at least the majority of cadmium in the residue is still catalytically active and that it is possible simply to recycle the residue to serve as catalyst for the reaction. The use of the residue in this manner, however, adds to the amount of impurities present in the reaction product and complicates the recovery of acid. It is thereby apparent that an inexpensive method for recovering the cadmium from the residue in a form more satisfactory for recycling would be a contribution of great economic and practical significance. It is an object, therefore, of this invention to provide a method for recovering cadmium from the water-insoluble residue that is obtained in the practice of the aforesaid process.

It is known, of course, that cadmium carbonate and metallic cadmium, as well as other cadmium compounds, are soluble in mineral acids. However, attempts to dissolve the cadmium by contacting the residue with hydrochloric acid and with sulfuric acid resulted in impractically low recoveries of the cadmium. Even boiling the residue in these acids gave very little improvement. It thereby became apparent that the organic impurities contained in the residue in some way interfere with the dissolution of the cadmium by the aforesaid acids.

In contrast to the relative ineffectiveness of the hydrochloric and sulfuric acids in dissolving the cadmium in the residue, I have discovered that nitric acid is capable of dissolving the cadmium substantially completely without dissolving any substantial amount of the organic components of the residue. Based on the aforesaid discovery, this invention provides a method for the recovery of cadmium from the residue previously described which comprises contacting the said residue with nitric acid until substantially all of the cadmium is dissolved. There is obtained by this method an acidic extract comprising cadmium nitrate from which a substantially pure cadmium salt can be obtained by neutralization with, for example, sodium carbonate which causes the cadmium to precipitate as cadmium carbonate.

The invention will hereinafter be described with specific reference to the production of terephthalic acid. However, it is to be understood that the invention is applicable also to the recovery of cadmium from reaction residues obtained in the transformation of polycyclic aromatic carboxylic acids to polycyclic aromatic dicarboxylic acids.

The following examples are presented as illustrative of preferred embodiments of the invention. Parts and percentages in the examples and elsewhere in the specification are by weight unless otherwise specified.

*Example 1*

In a pebble mill there was mixed 50 parts of potassium benzoate and 1.2 parts of cadmium chloride. The resulting mixture was placed in a stainless steel pressure vessel which was then flushed and tested to 200 p. s. i. with carbon dioxide. The pressure of carbon dioxide was then bled to 150 p. s. i. and the reaction mixture was heated to 440° C. and held at this temperature for 1 hour. During the period at reaction temperature, the carbon dioxide pressure was maintained constant and the byproduct, benzene, removed by bleeding the off-gas into a series of traps to condense and collect benzene. At the end of the reaction period, the pressure was vented to atmospheric and the contents of the vessel cooled to room temperature. A solid reaction product in the amount of 37.5 parts was removed from the vessel.

To the solid reaction product there was added about 20 times its weight of water. The resulting mixture was heated to the boiling point to effect dissolution of potassium terephthalate and potassium benzoate leaving an insoluble residue suspended in the water. The resulting solution was filtered by gravity filtration to remove the insoluble residue. The latter was washed with hot water until the wash water yielded no precipitate on acidification.

The filtrate and washings were combined and acidified with 6 N hydrochloric acid to precipitate terephthalic acid in a yield of 85% based on the potassium benzoate charged.

The insoluble residue remaining in the filter was collected and dried and amounted to 2.5 parts. The residue was examined analytically and found to contain substantially all (about 99%) of the cadmium present in the initial reaction mixture. X-ray analysis indicated the cadmium to be predominantly in the form of cadmium carbonate and a minor amount in the form of metallic cadmium. The balance of the residue comprised dark-colored organic impurities of unknown constitution.

The insoluble residue was charged to a reaction vessel equipped with a magnetic stirrer and with the stirrer operating there was charged directly to the vessel 14.2 parts of 20% aqueous nitric acid which had been heated to a temperature of about 100° C. This provided 240% excess nitric acid based on the amount theoretically required to extract the cadmium. Considerable foaming was observed but this subsided in approximately 5 minutes and the resulting mixture was immediately filtered. The filter cake was washed with about 3 times its volume of water and the wash water combined with the filtrate.

To the filtrate there was added sufficient 10% aqueous sodium carbonate to neutralize the acidity of the filtrate whereby cadmium carbonate precipitated in finely-divided form. The cadmium carbonate was recovered by filtration and after being dried was found to contain 98.7% of the cadmium that was initially present in the reaction mixture.

*Example 2*

This experiment was carried out in the same manner as Example 1 except that 10.5 parts of 10% aqueous nitric acid (an excess of 25% of the amount theoretically calculated to extract the cadmium) was employed to extract the cadmium from the residue and the extraction was carried out at room temperature for 10 minutes. The amount of cadmium recovered as cadmium carbonate was approximately 95.7% of the cadmium initially present in the reaction mixture.

*Example 3*

There was charged to a rotary autoclave, which contained loose porcelain spheres in its interior, a mixture of 200 parts of dipotassium phthalate and 10 parts of cadmium oxide. Carbon dioxide was introduced into the autoclave until the interior pressure reached 750 p. s. i. g. The autoclave and its contents were then heated to 425° C. and held at this temperature for 5 hours. The maximum pressure reached during the period of heating was 1800 p. s. i. g. The autoclave was then cooled and a solid reaction product in the amount of 201 parts was withdrawn.

The reaction product was dissolved in 6 times its weight of water and the solution was heated to boiling and then filtered. The filter cake was washed thoroughly with hot water and the washings added to the filtrate. The filtrate was then acidified with diluted hydrochloric acid whereupon terephthalic acid precipitated. The amount of terephthalic acid recovered was 77.4% of the theoretical yield.

A water-insoluble residue was recovered as a filter cake from the preceding filtration. This residue after being dried amounted to 10 parts and was analyzed as containing substantially all of the cadmium initially present in the reaction, the majority of the cadmium being in the form of cadmium carbonate with a lesser amount being in the form of metallic cadmium. The balance of the residue consisted essentially of dark-colored organic impurities of unknown constitution.

The residue was treated in the same manner as the residue of Example 2, i. e., by extraction with a 10% aqueous solution of nitric acid. The nitric acid extract was neutralized with sodium carbonate and the amount of cadmium recovered as cadmium carbonate was approximately 96% of the cadmium initially present in the reaction.

*Example 4*

In this example 200 parts of dipotassium isophthalate and 10 parts of cadmium oxide were heated for 4 hours at 430° C. in the same rotary autoclave employed in Example 3. During the reaction the interior of the autoclave was occasionally flushed with carbon dioxide at atmospheric pressure. A reaction product amounting to 193 parts was obtained.

The reaction product was dissolved in 6 times its weight of water by the procedure described in Example 3 and then filtered. The filtrate on acidification yielded terephthalic acid amounting to 45.5% of the theoretical yield.

The insoluble residue obtained by filtration amounted to 10 parts and was found to contain substantially all of the cadmium present in the reaction initially. The balance of the residue consisted essentially of dark-colored organic impurities.

The extraction of the residue with 10% aqueous nitric acid by the procedure of Example 2, followed by neutralization of the extract, resulted in a 97% recovery of cadmium as cadmium carbonate.

The preceding examples have shown that extraction of the insoluble residue with nitric acid results in almost quantitative recovery of cadmium. As previously stated, the action of nitric acid on the residue has been found to be very selective because other mineral acids employed in the same manner have failed to extract sufficient cadmium to provide economical recovery. This will be shown by the following examples which are outside the scope of the invention.

Example A

A water-insoluble residue was obtained by the exact procedure described in Example 1. There was added to the residue sufficient 37% hydrochloric acid to provide 500% excess hydrochloric acid based on the amount of cadmium in the residue. The resulting mixture was heated to the boiling point and held at this temperature for 30 minutes. The mixture was then filtered and the filtrate neutralized with sodium carbonate. The amount of cadmium recovered as cadmium carbonate by this process amounted to only about 25% of the amount of cadmium contained in the residue.

Example B

An insoluble residue was obtained according to the exact procedure of Example 1. To the residue there was added sufficient 10% sulfuric acid to provide 100% excess acid based on the amount of cadmium in the residue. The temperature was raised to approximately 100° C. and maintained at this temperature for approximately 15 minutes. The resulting mixture was filtered and the filtrate neutralized with sodium carbonate as before. The amount of cadmium recovered as cadmium carbonate was approximately 74.4% of the cadmium initially present in the reaction and 75.5% of the cadmium contained in the residue. The same experiment carried out at room temperature resulted in a cadmium recovery of only 64%.

As has been demonstrated, the process of the present invention provides substantially quantitative recovery of cadmium from the insoluble residue. The essential step of the process comprises contacting the residue with nitric acid for a sufficient period of time to dissolve the cadmium; usually 1 to 5 minutes is a sufficient contact time. Recoveries of cadmium range generally in excess of about 90% of the amount of cadmium initially present in the reaction.

The process of the invention can be carried out at any convenient temperature and at subatmospheric, atmospheric, or superatmospheric pressure. From the convenience standpoint, it is preferable to carry out the reaction at approximately room temperature and atmospheric pressure, since no appreciable benefit is obtained under other conditions. However, this is not meant to exclude the employment of any other conditions under which the nitric acid remains in liquid phase.

The concentration of nitric acid can be widely varied without any great effect on thoroughness of the extraction. Generally speaking, the concentration of nitric acid can range from about 1% to 86% but more preferably will range from about 5% to about 25%.

As has been shown in the examples, the recovery of cadmium in a usable form following the extraction can be accomplished by well-known physical and chemical methods. Usually it is preferred to separate the undissolved organic impurities from the nitric acid extract by some convenient means, such as filtration or centrifugation. The clear extract so obtained can then be treated by any of several methods to recover a compound of cadmium. The examples have illustrated neutralization of the extract with sodium carbonate to precipitate cadmium carbonate. The cadmium may also be precipitated, for example, in the form of cadmium hydroxide if it is so desired.

This application is a continuation-in-part of application Serial No. 578,191, filed April 16, 1956, now abandoned.

What I claim and desire to protect by Letters Patent is:

1. In the manufacture of an aromatic dicarboxylic acid wherein a monovalent metal salt of another aromatic carboxylic acid is heated in the presence of a cadmium catalyst to form the corresponding monovalent metal salt of the desired aromatic dicarboxylic acid and the reaction product is extracted with water leaving a water-insoluble residue containing cadmium, the method of recovering cadmium from said residue which comprises contacting the residue with nitric acid to dissolve the cadmium present therein.

2. In the manufacture of terephthalic acid wherein a monovalent metal salt of a benzene carboxylic acid other than terephthalic acid is heated in the presence of a cadmium catalyst to form the corresponding monovalent metal salt of terephthalic acid and the reaction product is extracted with water leaving a water-insoluble residue containing cadmium, the method for recovery of cadmium from said residue which comprises contacting the residue with nitric acid to dissolve the cadmium present therein.

3. In the manufacture of terephthalic acid wherein a potassium salt of a benzene carboxylic acid other than terephthalic acid is heated in the presence of a cadmium catalyst to form a potassium salt of terephthalic acid and the reaction product is extracted with water leaving a water-insoluble residue containing cadmium, the method for recovery of cadmium from said residue which comprises contacting the residue with nitric acid to dissolve the cadmium present therein.

4. The method according to claim 2 which comprises contacting the residue with nitric acid to dissolve the cadmium present therein and subsequently neutralizing the nitric acid extract with sodium carbonate to precipitate cadmium as cadmium carbonate.

References Cited in the file of this patent

UNITED STATES PATENTS

| | | |
|---|---|---|
| 2,145,816 | Stoops | Jan. 31, 1939 |
| 2,215,885 | Roelen et al. | Sept. 24, 1940 |
| 2,237,311 | O'Brien | Apr. 8, 1941 |
| 2,643,196 | Allan | June 23, 1953 |

OTHER REFERENCES

Mellor: Comprehensive Treatise on Inorganic Chem., vol. 4, 1923, pages 643, 651.

Ingalls: Metallurgy of Zinc and Cadmium, published by Engineering and Mining Journal, 261 Broadway, New York, 1903, pp. 582, 583.